C. VAN AMBURGH.
GREASING MACHINE.
APPLICATION FILED MAY 5, 1915.

1,214,618.

Patented Feb. 6, 1917.
6 SHEETS—SHEET 3.

Fig. 3

WITNESS
Chas. F. Clagett

INVENTOR
Charles Van Amburgh
BY Messimer & Austin
ATTORNEY

C. VAN AMBURGH.
GREASING MACHINE.
APPLICATION FILED MAY 5, 1915.

1,214,618.

Patented Feb. 6, 1917.
6 SHEETS—SHEET 5.

WITNESS
Chas. F. Clagett

INVENTOR
Charles Van Amburgh
BY Messimer and Austin
ATTORNEY

C. VAN AMBURGH.
GREASING MACHINE.
APPLICATION FILED MAY 5, 1915.

1,214,618.

Patented Feb. 6, 1917.
6 SHEETS—SHEET 6.

WITNESS
Chas. F. Clagett

INVENTOR
Charles Van Amburgh
BY
Messner and Austin
ATTORNEY

UNITED STATES PATENT OFFICE.

CHARLES VAN AMBURGH, OF TACOMA, WASHINGTON, ASSIGNOR TO AMERICAN SMELTING & REFINING CO., A CORPORATION OF NEW JERSEY.

GREASING-MACHINE.

1,214,618. Specification of Letters Patent. Patented Feb. 6, 1917.

Application filed May 5, 1915. Serial No. 26,182.

*To all whom it may concern:*

Be it known that I, CHARLES VAN AMBURGH, a citizen of the United States, and resident of Tacoma, in the county of Pierce and State of Washington, have invented certain new and useful Improvements in Greasing-Machines, of which the following is a specification.

My invention relates in general to a machine for feeding articles, to, through and from a treating bath and particularly relates to a greasing machine for treating the starting sheets such as are usually used as cathode plates in the electrolytic production of copper.

It is a general object of my invention to provide a machine for producing uniformly dressed or coated articles such as plates with the least possible amount of manual labor.

One of the objects incidental to this general object is to provide a simple and compact form of machine for advancing the articles into and through a treating bath for a predetermined time, for removing the treated articles from the bath, for removing any surplus material used during the treatment and finally for placing the treated plates upon a drying frame or conveyer, in position ready for the next step to which the articles are to be subjected.

A general object of my invention is to provide a machine for producing uniformly dressed plates with the least possible amount of manual labor.

One of the objects incidental to this general object is to provide a simple and compact form of a machine for advancing the plates into and through a greasing bath for a predetermined time, for removing the greased plates from the bath, for removing any surplus grease and finally for placing the treated plates upon a drying frame or conveyer, in position ready for the next step in the electrolytic process.

Another object of the invention is to provide a machine of the above indicated character which can be operated efficiently from a single source of power and with the several parts thereof so arranged in their relative sequency of operation that the articles to be treated are advanced from place to place over the shortest possible path and without subjecting the same to any rough treatment.

A further special object of the invention is to provide a greasing machine which will be clean in its operation and designed so that the operating mechanisms shall be free of splashing grease and arranged so that it may be readily cleaned and conveniently dismounted.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings.

For convenience of installation the machine illustrated is preferably mounted upon two levels of floors of a building, the upper level or floor 15 of which has an opening 16 therein providing admission to a greasing tank 17 disposed below the level of the floor 15. An ingoing conveyer 18 for receiving the cleaned plates from a crane and for arranging and advancing the same toward the opening to the greasing tank is mounted on the floor or level 15 to one side of the opening. A similar conveyer 19 for receiving the treated plates as they are lifted from the tank is disposed on the opposite side of the opening. The plates are advanced while in the tank by a conveyer 20 constituting a continuation of the conveyers 18 and 19 positioned between and below the same. As these conveyers are similar in construction a detailed description of any one will be sufficient, with obvious mechanical changes, for all the plate advancing apparatus shown. Each of the conveyers is formed of a pair of spaced apart parallel upright frames 21 between which the cleaned plates 22 are positioned, equally spaced apart and arranged in a column with the plates hung vertically and transversely of the frame. Each of the frames includes an L-bar 23 with a vertically disposed web, the upper edge of which constitutes a track 24 for receiving the projecting flanges 25, which extend laterally from opposite sides adjacent the upper edge of the plates 22. The track bars 23, in the case of the conveyers 18 and 19, are mounted at the upper end of posts 26 fixed to the floor 15 and, in the case of the tank conveyer 20, these track bars are riveted directly to opposite sides of the tank 17, as shown in Fig. 5.

In order to center the plates on the ingoing conveyer 18, as they are dropped between the frames thereof, bearing strips 27 extend longitudinally of the frames in position to engage opposite edges of the plates. These strips are each pivoted to the upper ends of a pair of toggle levers 28, the lower ends of which are pivoted to brackets 29 fixed to the outside of the bars 23. Depending link rods 30 are attached to the levers at their elbows and are connected by means of crank arms 31 to shafts 32 mounted in brackets 33 carried on the outside faces of two of the posts 26 on each side of the conveyer 18. The shaft 32 on one side is rocked by means of a hand lever 34 so as to move the bearing strip on that side to and from its plate engaging position. A pedal 35 is located convenient to the lever 34 and is connected through a swinging frame 36, passing transversely through the conveyer with the shaft 32 on the opposite side of the device thereby to move the strip on the opposite side into engagement with the plates. This strip is held in its plate engaging position by a tripping latch 37 engaging a slot in the pedal. On the release of the latch the bearing strip controlled by the pedal is moved into inoperative position by means of a compression spring 38 having one end bearing upon a stop 39 fixed to the frame 36 and having its opposite end bearing against a fixed bracket 40.

The plates 22 are advanced along the tracks 24 of the conveyer 18 from the position in which they are deposited by the crane to the delivery end thereof by means of a pair of reciprocating feed racks 41 and along the tracks of the conveyer 19 by means of feed racks 42 differing from the racks 41 only in that the projections or teeth 43 defining the upper edge of the racks are not as fully spaced apart as they are on the racks 41 and further differing in that the racks 42 has a proportionately less length of stroke than the racks 41.

Figures 5, 9, 10:
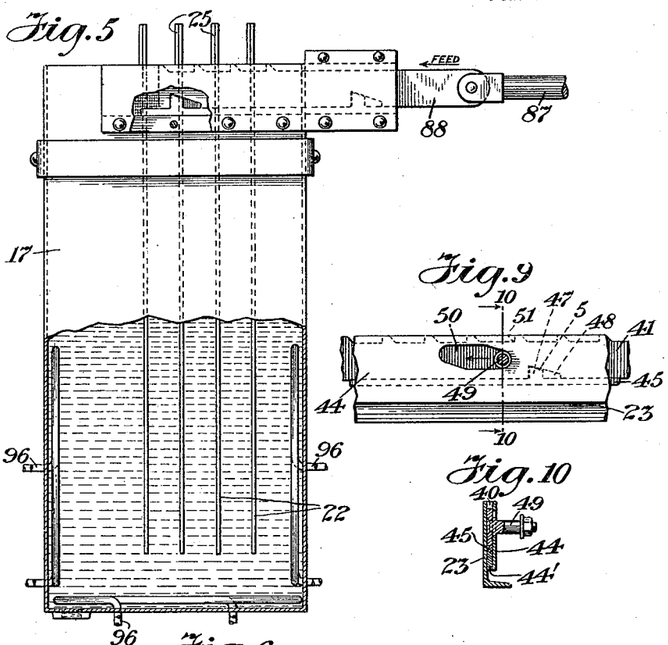
Fig. 5 is a detailed view in side elevation of the greasing tank and the plate feeding mechanism with parts broken away to show internal construction.
Figs. 9 and 10 are respectively a view in side elevation and a transverse sectional view on the lines 10—10 of Fig. 9 showing details of the feeding mechanism.
Figures 6, 7, 8:
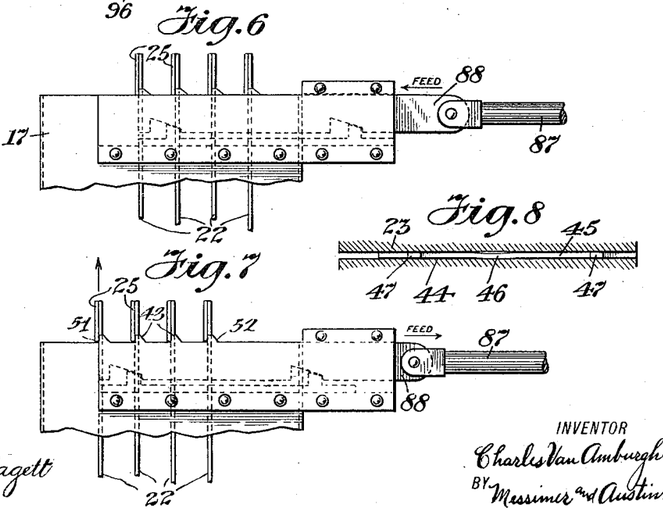
Figs. 6 and 7 are fragmentary detailed side views of the feeding mechanisms in different positions.
Fig. 8 is a plan view of the feed bar fitting between its guiding plates.

Referring particularly to Figs. 9 and 10 for details of construction of the plate feeding mechanism, it will be noted that the feed rack, 41 or 42, is guided between the web of the L-bar 23 and a guiding plate 44 spaced therefrom by a filler plate 44', which filler plate constitutes a track for a sliding lifting bar 45 which bar in turn, forms a movable support for the feed rack in its sliding movements. The lifting bars each have a portion thereof offset laterally from its general plane as shown at 46 in Fig. 8 to form a spring tight fit between the bar 23 and plate 44. The lifting bar is provided with a pair of upstanding lugs 47, each having a rearwardly beveled top edge and positioned within similarly shaped recesses 48. These recesses are notched into the underface of the feed bar, and each have a length materially less than the distance between succeeding teeth on the feed bar. A pin 49 extends laterally from one side of each of the feed racks and projects through a pin-guiding aperture 50 in the side of the plate 44. The spaced apart projections 43 are in the form of teeth having an abrupt front face 51 and a rearwardly extending beveled rear face 52. The feed racks are of such a height and so positioned on the bar 45 that the teeth thereof are disposed just below the bearing edge of the track when the feed racks are in their lowered position.

Side plates 53 are affixed to a pair of posts 26 on each side of the conveyers 18 and 19, and each plate supports a bell-crank lever 54, one arm of which is connected by a link rod 55 with the adjacent pin 49 thereby to reciprocate the feed rack, 41 or 42, attached thereto. Mechanism for reciprocating these feed racks, and for actuating the different other parts hereinafter described, is mounted upon a frame-work 56 positioned on a lower floor 57 of the building and beneath the opening 16. This mechanism includes a pair of shafts 58 and 59 journaled on top of the framework 56 and on opposite sides of the tank 17. The shaft 58 is connected by means of a pair of crank arms 60 and upwardly extending link rods 61 to the free arms of the bell crank levers 54 on the conveyer 18 and the other shaft 59 is connected by a chain of links and bell crank levers 62 with the free arms of the levers 54 on the conveyer 19 with the parts so arranged that the feed racks 41 and 42 are reciprocated in unison. The shafts 58 and 59 are connected so as to be rocked in the same direction by means of crank arms 63 fixed thereto and depending therefrom, which arms are linked together by the rod 64. The shaft 58 is rocked from a power shaft 65 by means of cranks 66 fixed to the ends of the power shaft with the crank pins 67 thereof journaled in slide block bearings 68 slidably mounted in guideways 69 formed at one end of rocking arms 70 depending from opposite ends of the shaft 58. A relatively large gear wheel 71 is fixed to the power shaft 65 and meshes with a pinion 72 fixed to a short shaft 73 paralleling the shafts 65 and 58 mounted in the framework 56. The shaft 73 has a gear wheel 74 fixed thereto and constantly in mesh with a worm 75 fixed to the inner end of an angularly disposed pulley shaft 76. The outer end of the shaft 76 has a power pulley 77 fixed thereto and adapted to be coupled to an electric motor 78 or other suitable source of power.

A cam plate 79 having a pair of spaced curved cam ledges 80 and 81 extending from one face thereof is fixed to the shaft 65 centrally thereof. These ledges are spaced and arranged eccentrically of the shaft 65 as shown in dotted lines in Fig. 1 to engage alternately on opposite sides of a roller 82. A lever 85 is pivoted intermediate its length to the bracket 86 with its lower end pivoted to the block 83 and its upper end connected by means of a forked rod 87 to a pair of feed bars 88 forming part of the conveyer 20 for advancing the plates through the tank. As the feed bar 88 is similar in construction and operation to the feed bars 41 and 42, the previous description of these parts will be considered as applicable to the feed bar 88 of the conveyer 20.

The tank 17 has an open top 89 rectangular in plane, centered relative to the opening 16 and spaced slightly below the level of the floor 15. The tank is seated within a pocket formed by the spaced apart brackets 90 fastened to the upper flanges of parallel I-beams 91 forming the upper portion of the frame-work 56. The tank is removably fastened in position by means of a pair of stay rods 92 passed through the brackets 90 and through flanges 93 projecting laterally from the bottom of the tank. The upper end of the side of the tank adjacent the conveyer 18 is extended above the other sides and bent outwardly to form an inclined guide-plate 94 designed to guide the lower edges of the plates 22 should they swing from their normal vertical position as they are inserted into the tank.

Figure 13:
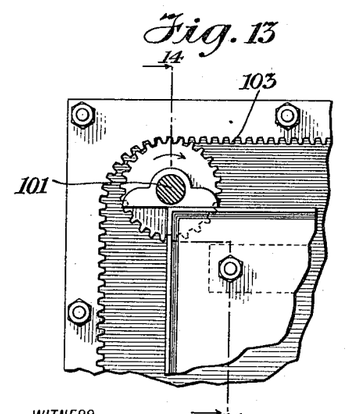
Fig. 13 is a fragmentary view in front elevation of an upper corner of the plate carriage and its support.
Figure 14:
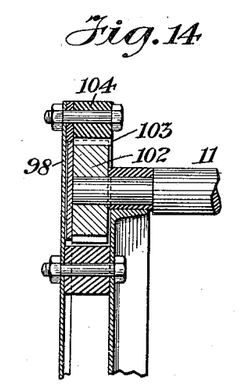
Fig. 14 is a transverse sectional view taken on the irregular line 14—14 of Fig. 13.

The tank is substantially filled with some greasing material 95, which is kept in its liquid state by heat introduced through steam pipes 96 arranged in the form of coils within the tank. The plate 22 at the delivery end of the conveyer 18 is lifted off the tracks 24, is then lowered into the tank and deposited onto the tracks of the conveyer 20. During this movement of the fresh plate a previously deposited plate is lifted from the tank 17 and off the conveyer 20 onto the conveyer 19. This transference of fresh and treated plates is affected by means of a plate carriage 97 which has a vertical and succeeding horizontal movement in a cycle disposed parallel to the direction of movement of the plates to and from the several conveyers. This carriage is formed of two vertically disposed side plates 98 guided for vertical movement between the spaced uprights 99 constituting part of the frame-work 56 on each side of the device. The lower end of each plate is provided with a horizontally disposed bearing iron 100 slidably engaging the adjacent uprights 99 on the inner faces thereof. The side plates 98 are maintained in their spaced apart relation by means of the shaft 73 and a corresponding shaft 101 fitting between the plates held against longitudinal movement and both journaled on top of the I-beams 91 as shown in dotted lines in Fig. 1. Opposite ends of these shafts are defined by gear-wheels 102 continuously in mesh with internal mangle racks 103, two of which are on each plate, one for each gear wheel. These racks are formed in face plates 104 affixed to the inner faces of the plates 98 and the teeth thereof are arranged in a continuous path substantially rectangular in elevation with rounded corners as shown in Fig. 13. The gear wheels 102 are driven in unison from the shaft 73, by means of a chain drive 105 passing over sprocket wheels 106 mounted on the shafts 73 and 101 and passing under a weighted idler sprocket 107, the latter designed to take up slack in the chain.

A skeleton frame 108 of less width than the plates 98 projects upwardly from the center of each of said plates to form a continuation thereof and is arranged to move with the carriage through the opening 16 and into the space between adjacent ends of the conveyers 18 and 19. A pick up finger in the form of an open top channel trough 109 extends inwardly from each of the upper corners of the frame 108 to engage the projections 25 on the plate 22 so as to lift and carry the same from and to the different conveyers. The weight of this carriage is substantially counterbalanced by a pair of weights 110 mounted at opposite sides of the machine and guided for vertical movement in containing casings 111. Flexible members 112 are attached to the weights 110 are trailed over pulleys 113 and 114 fixed to the floor 15, and are attached to opposite sides of the carriage by means of pins 115 projecting therefrom adjacent the bottoms.

Figure 11:
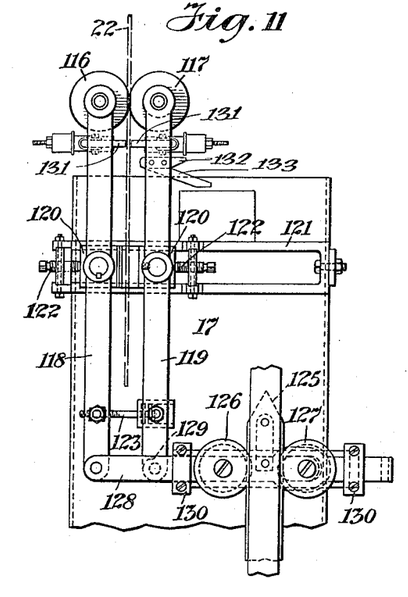
Figs. 11 and 12 are respectively a view in side elevation and a portion of a front elevation of the plate squeezing device.
Figure 12:
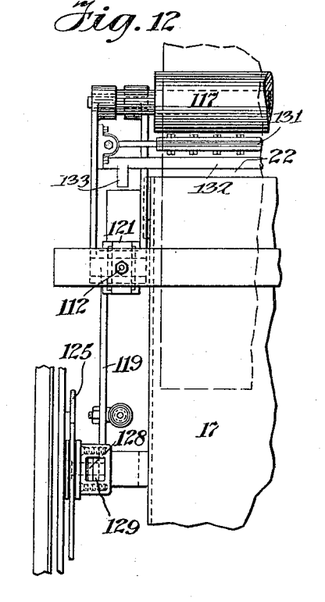

In order to remove surplus portions of the greasing material from the plates as they are raised from the tank there is provided a pair of co-acting rollers 116 and 117 positioned transversely of the length of the machine adjacent the receiving end of the conveyer 19, above the top of the tank and on opposite sides of the path of the plates as they are lifted from the bath in the tank. Referring to Figs. 11 and 12 it will be noted that the rollers are mounted on levers 118 and 119 which are fulcrumed intermediate their lengths in blocks 120 slidably mounted in guideways 121 fixed to opposite sides of the tank 17. These blocks together with the levers are adjustable relative to each other by means of set-screws 122 threaded through a part of the guideway construction and bearing on opposite sides of the blocks. The lower ends of the levers 118 and 119 are linked together by means of a plunger and spring connection 123, which tends to maintain the rollers in their opened or spaced apart positions shown in Fig. 1. One of the rollers 117 is provided with a bail or guide rod 124 which is clear of all moving parts and which constitutes a stop for limiting the forward swing of the plates 22 as they are removed from the conveyer 18.

The rollers are moved mechanically into position engaging opposite sides of the upwardly moving plate 22 by means of a shoe 125, fixed to the inner face of the side plates of the carriage and movable thereby into separating engagement with the spaced apart bearing wheels 126 and 127 disposed in its path of movement. These wheels 126 and 127 are mounted respectively on slide bars 128 and 129 which are slidably mounted in brackets 130 fixed to one side of the tank 17 and extend substantially at right angles to the levers. The bar 128 is pivoted to the lower end of the lever 118 and the bar 129 is similarly connected to the lever 119.

In order to provide a uniform coat of grease on the treated plates they may be drawn through wipers 131 and the surplus grease may be conveyed back to the grease tank through the open top trough 132 and directing spout 133.

In operation, let it be assumed that article to be treated, such as the cathode plates have been subjected to a cleaning process and are otherwise in condition ready to receive their coating of any suitable material such as grease. The plates more or less equally spaced apart, are carried into position by a crane or other suitable carrying mechanism and positioned edgewise between the bearing plates 27 which are normally in spaced apart position adapted to receive the plates therebetween. With the bank of plates in their raised position as shown to the right of Fig. 1, the lever 34 is then raised until the bearing strip 27 controlled thereby is brought into engagement with the adjacent edges of the plates after which the pedal 35 is depressed until it is caught and locked by the latch 37. This movement of the pedal causes the frame 36 to swing to the left Fig. 2 and to place the spring 38 under compression. The frame acts through lever 31 on the left of Fig. 2 causes the bearing strip 27 on the side opposite the pedal to move into engagement with the edges of the raised bank of plates thus centering the plates between the frames 21. When the plates are alined the latch 37 may be tripped, which permits the spring 38 to act on the frame 36 to move the bearing strip actuated thereby into an inoperative position and lowering the lever 34 similarly moves the strip controlled thereby into an inoperative position. After the bank of plates have been so alined they are lowered into position between the plates 23 as shown to the left of the conveyer 18 with their projections 25 resting on the track formed by the upper edges of these plates. The plates 22 are then fed along the apparatus 18 toward the end adjacent the opening 16 with a step by step movement. To describe this movement with reference to any of the conveyers shown let it be assumed that the feed rack 41 is moving on its plate advancing stroke from the position shown in Fig. 9 into the position shown in Fig. 6. During the initial portion of this movement, the inclined top face of each of the recesses 48 rides on the top edge of the lugs 47 so as to wedge the rack into the raised position shown in Fig. 6 with the teeth 43 projecting above the plane of the tracks. The elevated rack is then advanced along the track in the direction indicated by the arrow of Fig. 6 for the remainder of its forward stroke, carrying with it the bar 45. The distortion 46 of the feed racks will form a frictional tight fit between the racks and their guideways which will act to retain the racks in place during their reciprocating movements.

Each set of teeth considered transversely of the device may engage the projections 25 of one of the plates to advance the same along the track and as many plates may be advanced at one time as there are sets of teeth. At the end of the stroke the parts are in the position shown in Fig. 7, in which position the feed rack is about to retreat in the direction indicated by the arrow. As the feed rack begins to move back it slides down the inclined top of the lugs 45 thus dropping so as to bring the teeth thereof below the track and to clear the projections 25 resting on the tracks as the rack retreats submerged to its initial position. As the rack moves rearwardly in its lowered position the forward edge of the recess 48 engages the lug causing the rack to shift the bar 45 into its initial position shown in Fig. 9. The feed rack is thus returned to its original position again, to be advanced forward to carry with it the bank of plates for the next succeeding forward step thereof. From this construction it will be seen that every point of the feed rack describes a cycle about a path in a vertical plane which path is substantially a parallelogram in form.

Figure 1:
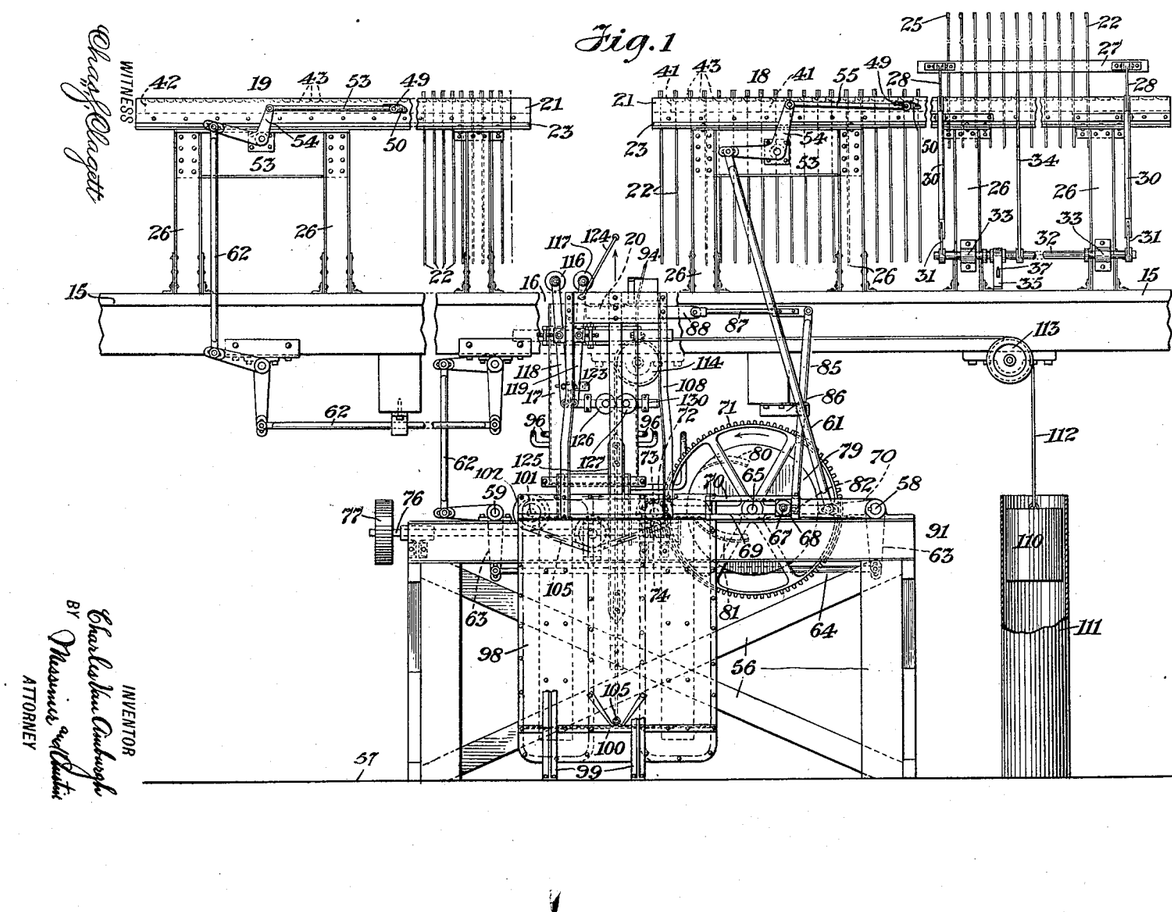
Figure 1 is a side elevation of a preferred embodiment of my invention with parts broken away to reduce the length of the machine and to show internal constructions.
Figure 2:
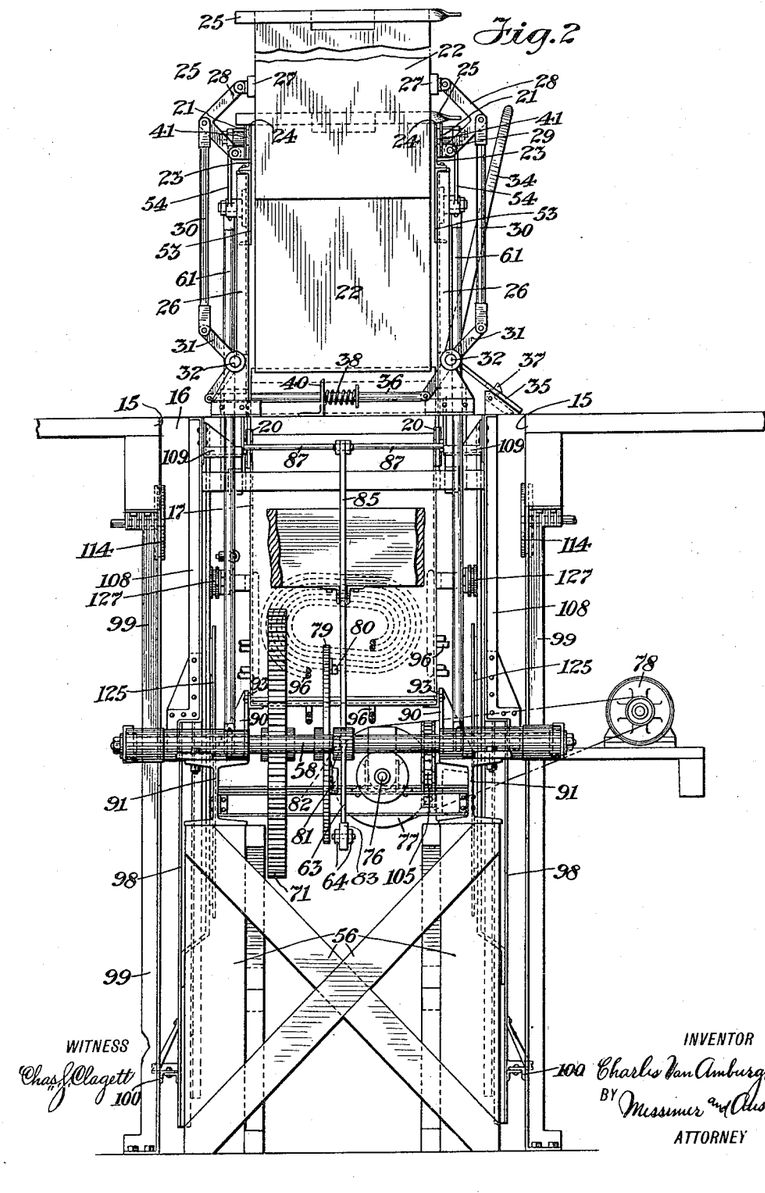
Fig. 2 is a right end view of the device shown in Fig. 1 with parts broken away.
Figure 3:
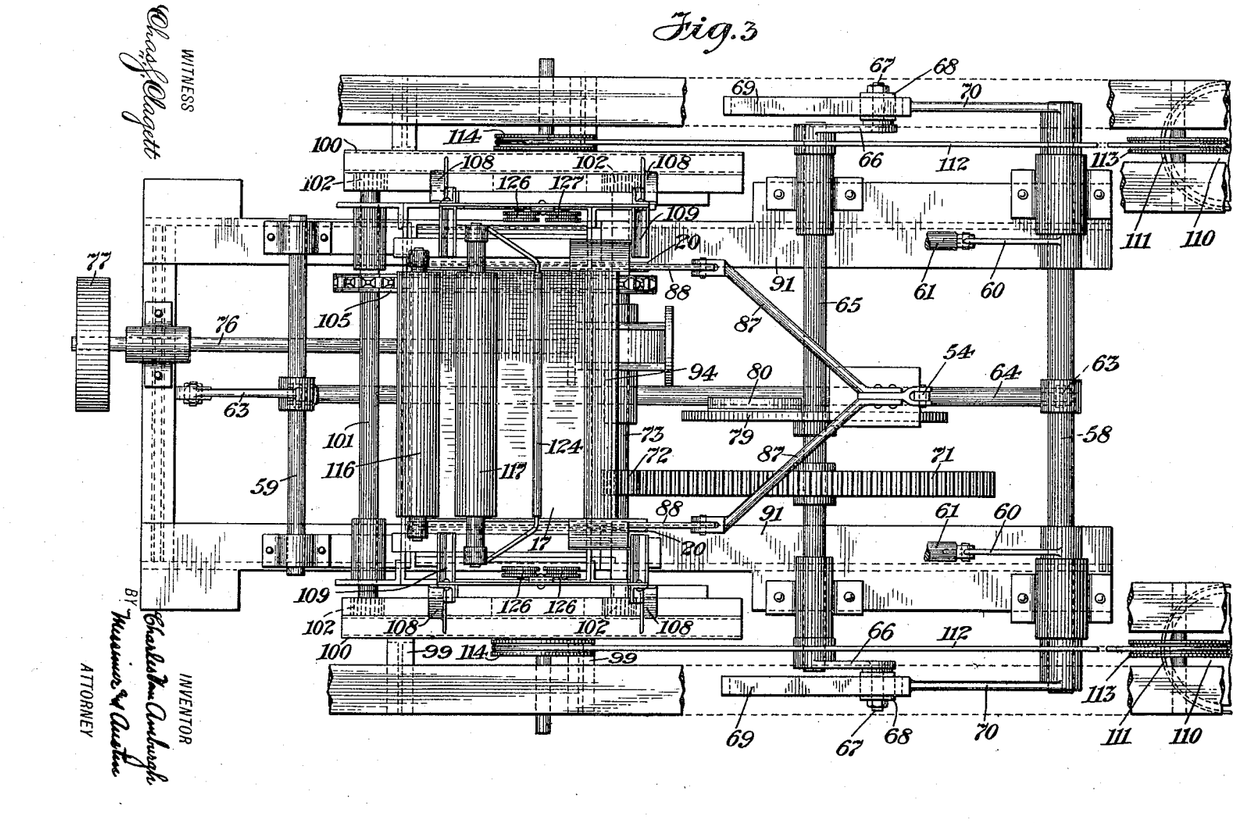
Fig. 3 is a plan view of the central portion of Fig. 1, enlarged to show details of construction.
Figure 4:
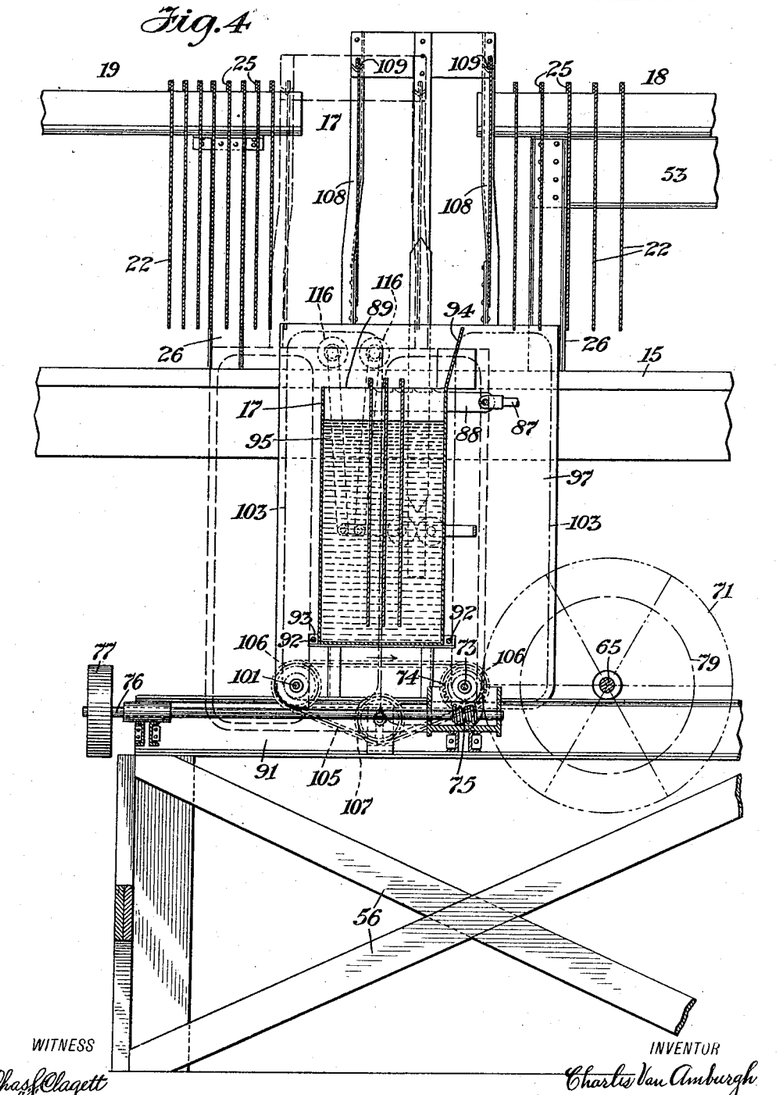
Fig. 4 is a fragmentary longitudinal sectional view showing details of the greasing tank, the plate carriage and part of the operating means therefor.

As the plates are thus advanced the carriage 88 has been moving upward with the troughs 109 beneath the last or most advanced plate on the conveyer 18 as shown in Fig. 1. The troughs are moved from the position shown in Figure 1 into the position shown in full lines in Fig. 4, during which movement they engage the projection 25 on opposite sides of the plate and raise the same off the track. Having reached the limit of its upward movement the carriage will be moved horizontally by the engagement of the gear wheel 102 in the lower horizontal portion of the mangle racks 103. The continued rotation of the gears 102 causes the carriage to advance laterally, i. e. parallel to the length of the apparatus, first into a position adjacent the conveyer 19 and deposit the treated plates as hereinafter described and then into the position shown in dash lines in Fig. 4. With a continuous dropping movement the carriage is then lowered by the continued rotation of the gear wheels in a vertical portion of the mangle rack until the incoming plate is positioned with its lower portion within the greasing composition in the tank, the plate being guided into position between the chute 94 and bail 124. The tank conveyer 20 then advances the plates through the tank in a manner similar to the advancing of the plates along the conveyer 18 and the mechanism is so timed in its movement that there are a plurality of plates in the tank undergoing treatment at one time.

Each upward movement of the carriage brings the pair of troughs 109 adjacent the conveyer 19 into engagement with the projections on the plate which is at the delivery end of the conveyer, which plate has been in the bath the longest. The operation at this side of the carriage is similar to that described for lifting the plates down onto the conveyer 20 and acts to raise the treated plate from the position shown in Fig. 1 first into the full line position shown to the left of Fig. 4 and then into the dash line position of this figure to deposit the plates on the outgoing conveyer 19.

The plates 22 are advanced along the conveyer 19 in the same manner as has been described for the actuation of the plates along the conveyer 18, except that the plates are positioned thereon relatively close together so as to prolong the period of drying treatment to which the plates are subjected while on the conveyer 19.

The greased and dried plates are withdrawn from the outer end of the conveyer by any suitable mechanism and subjected to the next step of the electrolytic treatment. By means of a device of this character, the cathode plates are regularly fed along the several conveyers in a definite spaced apart relation and are arranged so as to be conveniently subjected to any desired drying or other treatment. As they reach the delivery end of the ingoing conveyer or the end of the tank conveyer they are set one after the other in a definite position to be picked up by the shifting carriage and are arranged so as to be quickly and easily carried thereby to the next conveyer without contact with any greased surface.

All of the moving parts are arranged so as to be free of any falling grease and the parts are arranged in an open structure to facilitate cleaning and repairing the same. The parts are designed to have the least possible travel in conveying the plates through the machine thus resulting in an economy in initial construction and in the operation of the machine.

The plates are treated in the greasing tank for a preset time and as all of the parts immersed in the bath are subjected to identically the same treatment a uniform product is attained. The squeezing rollers may be readily regulated so as to leave just the proper coating of grease on the plates so that the plates are in their proper condition for the next step in their process of treatment. The adjustment provided by the blocks 120 also provides a means for adjusting the rolls relative to the path of travel of the plates.

It is obvious that a device of this character may be run at relatively high speeds and a quick greasing of the plates attained without abnormal strain or wear on the machine.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a device of the class described, the combination with a coating tank a pair of tracks adapted to receive a column of plates therebetween with portions thereof resting on the tracks and designed to lead the plates toward the tank, of means for centering the plates before they are lowered onto the tracks, said means comprising a pair of alining bars positioned above the tracks and extending lengthwise thereof, and manually actuated means for moving said bars toward each other in a direction transversely of the length of the tracks thereby to engage opposite edges of the plates to move the same within the lines of the tracks.

2. In a device of the class described, the combination of a greasing tank of a plate centering device comprising a pair of spaced apart parallel alining bars mounted for bodily movement transversely of their length toward and from each other, toggle levers for moving said bars, manually controlled means linked to said levers for moving the bars toward each other, a spring acting on one of said means for moving the bar attached thereto in a direction away from the other bar thereby to open the bars relative to each other and means for acting on said alined plates to advance the same toward said greasing tank.

3. In a device of the class described, the combination with a greasing tank, of means for feeding the plates toward said tank including a plate feeding mechanism comprising a track adapted to support the plates, a feed rack mounted for reciprocatory movement parallel to the track and provided with a projection from its upper side for engaging the rear of the plate to advance the same, means for raising the rack to bring the projection above the level of the track and into engagement with the plate as the rack is advanced in one direction and for lowering the projection as the rack is returned in the opposite direction whereby the plate is advanced by a step-by-step movement along the track.

4. In a device of the class described, the combination with a greasing tank, of a track adapted to have a plate carried thereby to be fed to the tank, a reciprocating feed rack positioned below the track and having a movement parallel thereto, said rack having plate engaging means positioned above the track when moving in one direction and positioned below the track when moving in the opposite direction, said positions of the tracks being operatively dependent upon the direction of movement of the rack whereby said bar in its forward movement is adapted to advance the plate along the track and in its movement in the reverse direction is depressed in inoperative position.

5. In a device of the class described, the combination of a tank, of a plate feeding mechanism comprising a track leading to said tank, a lifting bar slidably mounted for movement parallel to said track and below the same, a feed rack slidably mounted on said lifting bar and normally positioned below said track, means for reciprocating said feed rack, a wedging engagement between said rack and bar whereby the upper part of said feed rack is raised above said track as it is advanced in one direction.

6. In a device of the class described, the combination with a greasing tank, of means for feeding a plate toward said tank, said means including a lifting bar provided with a lug projecting from the upper face thereof, said lug having a rearwardly inclined top face, a reciprocating feed rack slidably mounted on said bar, said feed rack having a recess in its underside containing said lug and having a rearwardly beveled top face supported by the top face of the lug, said lug being movable longitudinally in said recess whereby as the feed rack is advanced in one direction it is wedged off the lifting bar by the interengaging of said beveled faces.

7. In a device of the class described, the combination with a greasing tank and track leading thereto, of a toothed feed rack mounted for reciprocatory movement in a vertical plane parallel to and adjacent to said track, every point of said rack having a cycle of movement substantially in the form of a parallelogram, said rack in its movement in one direction having the teeth thereof positioned above the track and in its movement in the reverse direction having the teeth below the level of the track.

8. In a device of the class described, an article transferring carriage movable about a continuous path in a vertical plane, a closed guideway defining said path, said carriage having a vertical movement and a succeeding horizontal movement continuous therewith, means forming part of the carriage for picking up plates disposed in its path of movement and for carrying the same to a different position, means for moving said carriage about its path and means for treating the articles at one place in their path of movement.

9. In a device of the class described, the combination of a support for an article to be moved, a carriage, means for moving said carriage vertically and horizontally about a continuous path, means forming part of said carriage adapted to be raised thereby toward the support to remove the article therefrom and to transport the same horizontally away from said support and a second support disposed in the path of the article as it is lowered by the carriage, said second named support adapted to remove the article from the carriage as the said means pass the support and to present the same in position to receive treatment.

10. In a device of the class described, the combination with a treatment device and means for feeding an article relative to said device, said means including a support for an article to be moved, a carriage, means for moving said carriage vertically and horizontally about a continuous path, means forming part of said carriage adapted to be raised thereby toward the support to engage and raise the article therefrom and to transport the same horizontally away from said support, a second support disposed in the path of the article as it is lowered by the carriage, said second named support adapted to remove the article from the carriage and means for substantially counterbalancing the weight of said carriage in its different positions.

11. In a device of the class described, the combination with a tank and a support for an article to be immersed in said tank, mechanism for transferring the article from the support to and from the tank, said mechanism including article engaging means designed to pick up the article, said means movable with the mechanism from a position below said support into lifting engagement with the article to raise the same from the support and said mechanism having a lowering movement toward the tank adapted to deposit the article in the tank.

12. In a device of the class described, the combination with a pair of spaced apart conveyers adapted to carry a plurality of articles and a tank disposed between said conveyers and below the same, of a carriage provided with article engaging means having a cycle of movement toward and from the tank and conveyers and adapted to lift an article from one of the conveyers and deposit the same into the tank and to lift a plate from the tank and position it on the other conveyer and means for advancing the plate while in the tank.

13. In a device of the class described, the combination with a pair of spaced apart conveyers adapted to carry a plurality of plates and a tank disposed between said conveyers, of a carriage comprising a pair of spaced apart plates each having a mangle rack with the teeth thereof arranged substantially in the form of a parallelogram, gear wheels rotatable about a fixed axis engaging said rack to cause the carriage to move vertically and then horizontally in its cycle of movement, lifting members carried by the carriage and movable therewith relative to said conveyers to lift a plate from one of the conveyers and deposit it in the tank and to lift a plate from the tank and position it on the other conveyer.

14. In a device of the class described, the combination of a conveyer having means for advancing an article toward a treating bath adjacent one end of said conveyer, a vertically movable carriage for lowering the article into the bath, said carriage having an engaging member movable toward and past said conveyer and adapted to lift the article from said conveyer, and intercepting means positioned in the path of movement of said carriage for receiving the article as the said member passes said intercepting means.

15. In a device of the class described, the combination of a pair of conveyers each having an article feeding means operable in the same general direction, one of said conveyers being positioned above and offset longitudinally from the other, a vertically movable carriage having a cycle of movement relative to said conveyers and provided with means for lifting an article from one of the conveyers as it moves in one direction and for depositing the article on the other conveyer as it moves in the opposite direction and a treatment device operatively associated with one of said conveyers.

16. In a device of the class described, a carriage for supporting objects to and from a treatment bath comprising a vertically disposed plate having a mangle rack on one side thereof, said rack having internal teeth arranged in a continuous path substantially a parallelogram in elevation with rounded corners, a gear wheel having a fixed axis of rotation continuously meshing with said rack, engaging means carried by said plate for supporting objects moved by the carriage and guiding means for maintaining said carriage in a vertical plane.

17. In a device of the class described, a carriage for supporting objects to and from a coating bath comprising a pair of spaced apart parallel plates, each provided with a mangle rack of similar configuration facing each other, a shaft having a fixed axis of rotation mounted between said plates and constituting a spacing means therefor, gear wheels defining opposite ends of said shaft and meshing with said racks to move the same in unison and guiding means engaging the outer faces of said plates to maintain the racks in mesh with said gear wheels.

18. In a device of the class described, the combination of a pair of spaced apart parallel and vertically extending plates, each provided with two mangle racks, the tracks of one plate facing the oppositely disposed rack on the other plate, the teeth of said racks each being arranged in a continuous path having a vertically and a horizontally extending portion, a pair of shafts extending between said plates and constituting spacing means therefor, gear wheels defining opposite ends of said shafts and meshing with said racks, one gear wheel for each rack, means for driving said gear wheels in unison, means for guiding said plates in their vertical movements and means carried by the plates for supporting articles to and from a position to receive a coating.

19. In a device of the class described, the combination of a pair of spaced apart parallel and vertically extending plates, each provided with two mangle racks, the tracks of one plate facing the oppositely disposed rack on the other plate, the teeth of said racks each being arranged in a continuous path having a vertically and a horizontally extending portion, a pair of shafts extending between said plates and constituting spacing means therefor, gear wheels defining opposite ends of said shafts and meshing with said racks, one gear wheel for each rack, means for driving said gear wheels in unison, means for guiding said plates in their vertical movement, means for counterbalancing said plates in all positions of the plates and means carried by the plates for supporting articles to and from a position to receive a coating.

20. In a device of the class described, the combination of a pair of spaced apart parallel and vertically extending plates, each provided with a pair of mangle racks, the racks of one plate facing the oppositely disposed rack on the other plate, the teeth of said racks each being arranged in a continuous path having a vertically and a horizontally extending portion, gear wheels engaging said racks, one gear wheel for each rack, means for driving said gear wheels in unison thereby to move both plates over a definite path and lifting means carried by each of said plates for supporting objects to and from a position to receive a coating.

21. In a device of the class described, the combination with a tank adapted to contain a plate for treatment therein, of means for conveying the plate to and from the tank, said means comprising a pair of plate lifting members positioned on opposite sides of the tank and movable in parallel vertical planes, mechanism for moving said means about a prescribed path, said mechanism including a plate fixed to each of said lifting members, mangle racks mounted upon each of said plates, gear wheels engaging said racks to move the same, one gear wheel for each rack, and means for driving said gear wheels in unison.

22. In a device of the class described, the combination with a tank adapted to contain a plate for treatment therein, of mechanism for introducing a plate into and removing another plate from the tank, said mechanism comprising a pair of plate lifting members positioned on opposite sides of the tank and movable in parallel vertical planes, each of said members having a pair of plate engaging members, each element of said pair of members co-acting with the corresponding element of the pair carried by the other plate lifting member to support a plate therebetween, each opposite pair of plate engaging members having an upward movement in one line and a downward movement in another line spaced therefrom and means disposed in the path of the plates carried by the plate engaging members for intercepting and for removing the plates from the mechanism on their downward movement.

23. In a device of the class described, the combination with a tank adapted to contain an article for treatment therein, plate feeding means adjacent the tank for moving an article positioned therein from one position to another, an article lifting means having a cycle of movement toward and from the tank, said means in its movement toward the tank adapted to deposit an article on said feeding means and in its movement away from the tank adapted to lift from the tank the article which has been moved therein by said feeding means.

24. In a device of the class described, the combination of two spaced apart article feeding mechanisms disposed in alinement, one of said mechanisms constituting an ingoing conveyer and the other constituting an outgoing conveyer for an article to be treated, a third article feed mechanism disposed between and below said spaced apart mechanism and adapted to feed the articles while the same are subjected to treatment, a carriage working between said spaced apart mechanisms and provided with article engaging means adapted to lift an article from the ingoing conveyer and deposit the same on the receiving end of said third mechanism and provided with other article engaging means adapted to lift an article from the delivery end of said third mechanism and deposit the same on said outgoing conveyer.

25. In a device of the class described, the combination of a tank adapted to contain an article to be treated, lifting means for conveying the article from the tank over a definite path, a pair of rollers disposed on opposite sides of the path of movement of the article as it is conveyed from the tank and means operatively connected to the rollers and controlled by the movement of said lifting means for moving said rollers toward each other to squeeze the article therebetween thereby to remove surplus material from the sides of the article.

26. In a device of the class described, the combination of a tank adapted to contain a plate to be greased, lifting means for conveying the plate from the tank over a definite path, a pair of rollers disposed on opposite sides of the path of movement of the plate as it is conveyed from the tank, means operatively connected to the rollers and controlled by the movement of said lifting means for moving said rollers toward each other to squeeze the plate therebetween thereby to remove surplus grease from the sides of the plate and means for adjusting the normal position of said rollers relative to each other and to the path of travel of the plate.

27. In a device of the class described, the combination of a greasing tank adapted to contain a plate to be greased, lifting means for conveying the plate from the tank over a definite path, a pair of rollers disposed on opposite sides of the path of movement of the plate as it is conveyed from the tank, means operatively connected to the rollers and controlled by the movement of said lifting means for moving said rollers toward each other to squeeze the plate therebetween thereby to remove surplus grease from the sides of the plate and means operatively connected to said rollers to move the same away from their plate engaging positions.

28. In a device of the class described, a plate squeezing device comprising a pair of levers disposed substantially parallel to each other, and pivoted intermediate their lengths co-acting squeezing rollers carried by said levers at one end thereof, slide bars attached to the opposite ends of said levers and extending in the same direction substantially at right angles thereto, bearing rollers extending laterally from each of said slide bars, and a shoe adapted to be moved into engagement with the rollers on the slide bars to separate the same and thus swing the squeezing rollers toward each other.

29. In a machine of the class described, the combination with means for subjecting an article to a coating of means for conveying the coated article away from said coating means, said conveying means having a step-by-step motion and designed to engage the coated article and to give the same a step-by-step movement while subjected to the action of the coating means.

30. In a device of the class described, the combination with a tank adapted to contain a treating substance, of an article conveying mechanism provided with article engaging means movable over a closed path to engage and convey the articles to and from said tank while said means are traveling along portions of the path and means, operable while the article is in the tank, for advancing the article over a definite distance and thus control the duration of treatment to which the article is subjected before the conveying mechanism withdraws the article from the tank.

31. In a device of the class described, the combination with a tank adapted to contain a treating substance, of an article conveying mechanism provided with article engaging means having a substantially vertical movement to and from the tank, a feeding means for advancing the articles in spaced apart order to said conveying mechanism and a withdrawing means for receiving the articles from the conveying mechanism, said feeding means and said withdrawing means adapted to feed the articles at a speed different from the rate at which the conveying mechanism advances the articles whereby the articles may be spaced apart distances on the withdrawing means different from the distances which they were spaced apart on the feeding means.

32. In a device of the class described, the combination with a tank adapted to contain a treating substance, of a conveyer for feeding articles to be treated to said tank and means for advancing said articles through said tank, said advancing means having a rate of travel slower than the rate of feed of the conveyer whereby a relatively small tank may be utilized.

33. In a device of the class described, the combination with a tank adapted to contain a treating substance, of a conveyer for feeding articles to be treated to said tank and intermittently actuated means separate from the conveyer for advancing said articles through said tank with a step-by-step movement.

34. In a device of the class described, the combination with a tank adapted to contain a treating substance, of a conveyer for feeding articles to be treated vertically to said tank and means for advancing said articles through said tank, said advancing means being horizontally disposed whereby the articles will be submerged in the treating substance at a uniform depth during the entire treating period and all parts of the treated portion of the article will receive a uniform treatment.

35. In a device of the class described, the combination with a tank adapted to contain a treating substance, of means intermittently actuated for receiving and advancing the portion of the article to be treated horizontally through said tank whereby all parts of the portion submerged in the substance will be subjected to the same treatment.

36. In a device of the class described, the combination with a tank adapted to contain a treating substance, of means for quickly submerging all of that portion of the article to be treated, means for causing an agitating movement between said submerged portion and the treating substance, and means for quickly withdrawing all of the treated portion at the termination of the treatment.

37. In a device of the class described, the combination with a tank adapted to contain a treating substance, of means for quickly submerging all of that portion of the article to be treated, a step-by-step feeding means for causing a prolonged and agitated contact between said submerged portion and said treating substance, and means for quickly withdrawing all of the treated portion at the termination of the treatment.

38. In a device of the class described, the combination with a tank adapted to contain a treating substance, of means for quickly submerging all of that portion of the article to be treated and a step-by-step feeding means for causing a relative movement between said submerged portion and the treating substance.

39. In a device of the class described, a tank designed to contain a bath of treating substance with a definite level, a horizontally disposed support designed to receive articles with portions thereof submerged in said bath at a definite depth and a feeding device operatively associated with said support to carry said articles with portions thereof submerged horizontally through said bath.

40. In a device of the class described, a tank adapted to contain a bath of treating substance, a horizontally disposed support designed to position the articles to be treated in a definite position relative to the level of the treating substance in said tank, a conveyer designed to move articles through said bath and along said support, means for feeding the articles into said bath and to said support and means for receiving the articles discharged from said support at the termination of the bath.

41. In a device of the class described, the combination with a tank adapted to contain a treating substance, of a conveyer coöperatively associated with said tank to cause the portion of articles to be treated to be passed through the substance and along a path, a support for defining said path, all portions of which path are positioned substantially uniform depths below the level of the substance and means at the end of said path for withdrawing the treated portion of the article from the substance.

42. In a device of the class described, the combination with a tank adapted to contain a treating substance and provided with a supporting track for the articles while under treatment in the substance, of a conveying organization coöperatively associated with said tank to receive the article to be treated and to feed the same in a substantially vertical direction into the substance and in spaced apart relation on said track and means operatively associated with said track for feeding the articles, through the substance for a material distance and in a direction substantially parallel to the level thereof, and then in a substantially vertical direction so as to raise the article clear of the substance.

43. In a device of the class described, the combination with a tank adapted to contain a treating substance, of a conveying mechanism coöperatively associated with said tank to feed the article to be treated in substantially vertical direction into the substance, another of said mechanisms designed to feed the articles through the substance in a direction substantially parallel to the level thereof, said last named mechanism designed to have a rate of travel slower than the other mechanisms, said organization including means moving in a substantially vertical direction thereby to raise the article clear of the substance and means positioned above the tank for feeding the articles to said conveying mechanism.

44. In a device of the class described, the combination with a tank adapted to contain a treating substance, of an organization of conveying mechanisms coöperatively associated with each other and with said tank to feed the article to be treated in a substantially vertical direction into the substance, through the substance in a direction substantially parallel to the level thereof, and then in a substantially vertical direction to raise the article clear of the substance and means for removing the articles automatically from the discharge end of said organization.

45. In a device of the class described, the combination with a pair of spaced apart supports for holding articles to be treated and a tank disposed between said supports and adapted to contain a treating substance, of an article conveyer having a vertical movement relative to said tank and a horizontal movement substantially parallel to the level of the substance in said tank, said conveyer provided with means for receiving the article from one of the supports and for delivering the articles to the other support and said conveyer designed while in the horizontal portion of its movement to maintain the articles to be treated within the treating substance.

46. In a device of the class described, the combination with a pair of spaced apart supports for holding articles to be treated and a tank disposed between said supports and adapted to contain a treating substance, of an article conveyer having a vertical movement relative to said tank and a horizontal movement substantially parallel to the level of the substance in said tank, said conveyer provided with means for receiving the article from one of the supports and for delivering the articles to the other support.

47. In a device of the class described, the combination of a tank adapted to contain a liquid treating substance, of means for advancing the articles to be treated while disposed in said treating substance, said means designed to advance the article with a step-by-step movement through the substance thereby to agitate the liquid substance.

48. In a device of the class described, the combination of two article conveyers, one disposed above the other, a tank adapted to contain a treating substance, the lower of said conveyers coöperatively associated with said tank to move the articles horizontally through the substance therein and vertically movable conveyer means designed to receive the articles from the discharge end of one horizontal conveyer and deliver them to the other horizontal conveyer.

Signed at Tacoma in the county of Pierce and State of Washington this 12th day of April, A. D. 1915.

CHARLES VAN AMBURGH.

Witnesses:
Louis C. Beyer,
L. D. Craig.

Copies of this patent may be obtained for five cents each, by addressing the "Commissioner of Patents, Washington, D. C."